United States Patent [19]

Kawata et al.

[11] Patent Number: 4,759,040
[45] Date of Patent: Jul. 19, 1988

[54] DIGITAL SYNCHRONIZING CIRCUIT

[75] Inventors: Yoshihiro Kawata, Tokorozawa; Masayuki Kawashima, Tokyo; Teruyuki Kubo; Masayuki Ito, both of Yokohama, all of Japan

[73] Assignees: Iwatsu Electric Co., Ltd.; Nippon Telegraph and Telephon Corporation, both of Tokyo, Japan

[21] Appl. No.: 945,858

[22] Filed: Dec. 23, 1986

[30] Foreign Application Priority Data

Feb. 1, 1986 [JP] Japan .................................. 61-20916

[51] Int. Cl.$^4$ ............................................. H04L 7/08
[52] U.S. Cl. .................................... 375/111; 375/116; 375/118; 375/120; 375/87
[58] Field of Search ................. 375/106, 111, 110, 87, 375/99, 80, 114, 116, 118, 120, 4; 328/63; 370/22, 105

[56] References Cited

U.S. PATENT DOCUMENTS 4,088,832 5/1978 Eastmond ............................ 375/110
4,363,002 12/1982 Fuller ..................................... 375/87

Primary Examiner—Robert L. Griffin
Assistant Examiner—Marianne Huseman
Attorney, Agent, or Firm—Oblon, Fisher, Spivak, McClelland & Maier

[57] ABSTRACT

CMI code has many features, but the interference on a transmission line resulted from radiant noise is an unavoidable problem. In the invention, WALSH 1 code is employed to solve the problem. Clock pulses having a frequency twice that of code on a transmission line in the WALSH 1 code are extracted. The extracted clock pulses consists of zero phase clock pulses and pi phase clock pulses, wherein the zero phase clock pulses are accurately extracted. An embodiment comprises an clock extraction circuit for extracting extracted clock pulses of $2f_0$ from a receive pulse train of frequency $f_0$, a latch circuit for latching the receive pulse train with the extracted clock pulses, a frame synchronizing circuit for obtaining frame pulses synchronized with the extracted clock pulses from the latched output pulses, a zero phase separation circuit for obtaining zero phase clock pulses from the extracted clock pulses and the frame pulses, and a regenerative discrimination circuit for obtaining a regenerated pulse train from the zero phase clock pulses and the latched output pulses. The regenerated pulse train has the same pattern as that of the original code from which the receive pulse train is converted by the WALSH 1 code.

14 Claims, 17 Drawing Sheets

FIG. 6

| FRAME Nos. | FRAME SIGNALS | INFORMATION BITS |
|---|---|---|
| $F_0$ | 0 0 0 0 | 0 1 1 ---------- 1 0 |
| $F_1$ | 0 0 0 1 | 0 1 0 ---------- 1 1 |
| $F_2$ | 0 0 1 0 | 1 0 1 ---------- 0 0 |
| $F_3$ | 0 0 1 1 | 1 1 0 ---------- 0 1 |
| ⋮ | ⋮ | ⋮ |
| $F_{13}$ | 1 1 0 1 | 0 0 1 ---------- 0 1 |
| $F_{14}$ | 1 1 1 0 | 1 1 0 ---------- 1 1 |
| $F_{15}$ | 1 1 1 1 | 1 0 1 ---------- 0 1 |

FIG. 7

| ORIGINAL CODE | 1 | --- | 0 | --- | 1 | --- | 0 | |
|---|---|---|---|---|---|---|---|---|
| RECEIVE PULSE TRAIN 30 | 0 | 1 | --- | 1 | 0 | --- | 0 | 1 | --- | 1 | 0 |

| INPUTS<br>STATES | COINCI-<br>DENT<br>PULSE | UNCOIN-<br>CIDENT<br>PULSE | NOTHING |
|---|---|---|---|
| SYNCHRO-<br>NISED<br>STATE | ENABLED<br>STATE | ENABLED<br>STATE | ENABLED<br>STATE |
| UNSYNCHRO-<br>NISED<br>STATE | ENABLED<br>STATE | DIS-<br>ABLED<br>STATE | ENABLED<br>STATE |

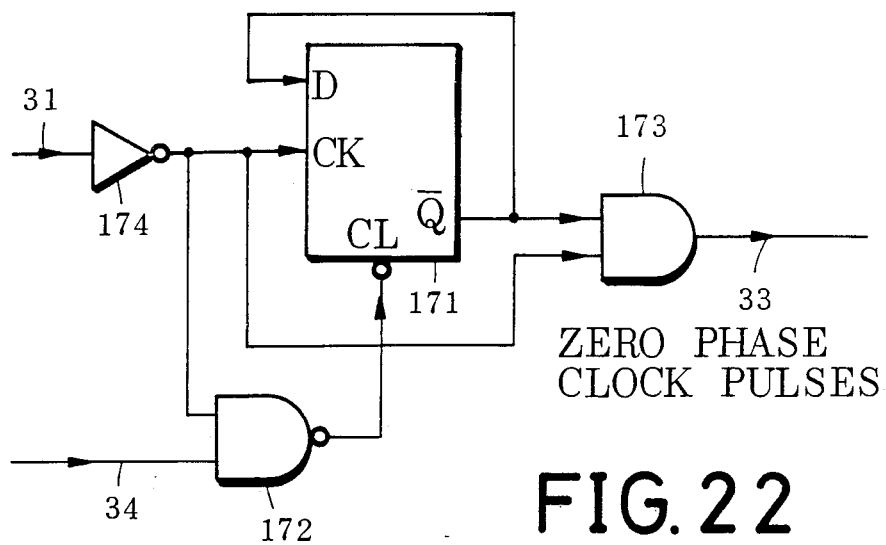
FIG. 22
(a) OUTPUT of INVERTOR 174 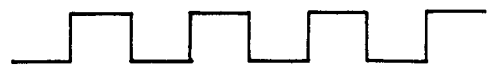
(b) FRAME PULSES 34 
(c) OUTPUT of NAND GATE 172 
(d) OUTPUT of FLIP-FLOP 171 
(e) ZERO PHASE CLOCK PULSES 33 
FIG. 23

DIGITAL SYNCHRONIZING CIRCUIT

BACKGROUND OF THE INVENTION

1. Field of the Invention

The present invention relates to a synchronizing circuit in digital communication.

The invention is particularly concerned with a synchronizing circuit for obtaining bit and frame synchronization to transmit digital signals without transmission errors caused by radiant noise on a transmission line.

2. Description of the Prior Art

In case of transmitting digital signals, bit synchronization is generally employed to extract a clock therefrom. A pulse train transmitted is regenerated with the extracted clock. Further, predetermined frame bits or frame patterns are extracted from the pulse train to obtain frame synchronization.

Such a conventional digital synchronizing circuit and time chart are respectively illustrated in FIGS. 1 and 2. Reference numeral 11 indicates a clock extraction circuit for extracting clock pulses from a receive pulse train 30 through and input terminal 21 and regenerating extracted clock pulses 31. 14 identifies a regenerative discrimination circuit for receiving the receive pulse train 30 and obtaining a regenerated pulse train 35 at a regenerated output terminal 23 by regeneratively discriminating the receive pulse train 30 with the extracted clock 31. 15 denotes a frame synchronizing circuit for receiving the regenerated pulse train 35 wherefrom a frame signal is extracted with the extracted clock 31 and for obtaining frame pulses 34 at a frame output terminal 22.

The receive pulse train 30 applied to the input terminal 21 is illustrated by non-return-to-zero code (NRZ) in FIG. 2 (a), wherein frame signals are predefined as "1,---1, --- 1, ---", and 4 bits are, in every frame, assigned to information bits to transmit information. Each "0" or each "1" shown in (a) indicates contents of original code transmitted. Receiving the receive pulse train 30, the regenerative discrimination circuit 14 outputs the regenerated pulse train 35 shown in (c) by regeneratively discriminating the receive pulse train 30 shown in (a) with trailing edges of the extracted clock pulses 31 shown in (b). The regenerated pulse train 35 shown in (c) is the same as the receive pulse train 30 shown in (a) except the former is delayed from the latter by one half of a period of the extracted clock 31. The regenerated pulse train 35 is delivered to the regenerated output terminal 23.

Receiving the regenerated pulse train 35 shown in (c) and the extracted clock pulses 31 shown in (b), the frame synchronizing circuit 15 samples the frame signals by the one bit shift hunting method e.g., in which the frame signals are inserted between information bits according to the predetermined protocol, and the frame synchronizing circuit 15 delivers the frame pulses 34 shown in (d) to the frame output terminal 22.

In the one bit shift hunting method, the specified bit ("1" of the frame signal in (a)) in a frame cycle is assumed as a framing bit among bits serially consisting of "0s" and "1s", every specified bit in every frame cycle is observed and during a period corresponding to some frame cycles (a frame cycle means the time between a frame signal and the next frame signal). If the specified bits are not estimated as frame signals, the specified bits to be observed are shifted by one bit in every frame. This operation is repeated till the frame signals are recognized.

For obtaining such an operation, transmission format is specifically defined, wherein there are two basic matters that what transmission code is employed (NRZ code is employed in FIG. 2 (a)) and by what protocol framing bits are inserted between information bits.

Regarding on required bandwidth, facility of extracting clock, facility of monitoring operation errors on a transmission line, no fadeout of timing information and the like, the format of transmission code to be employed is decided.

Conventional formats are illustrated in FIG. 3.

In AMI (alternate mark inversion) code, namely bipolar, when an original code is "0", the transmission code is "0", too, and when an original code is "1", a transmission code alternately changes to "+1" or "−1".

In NRZ (non return to zero) code, when an original code is "0" or "1", the transmission code is respectively "0" or "1" for the bit block.

In CMI (coded mark inversion) code, when an original code is "0", the transmission code changes from "0" to "1" in the midst of the bit block and when an original code is "1", the transmission code repeats alternately "1" or "0" for the bit block.

In WALSH 1 code, namely Manchester or dipulse code, when an original code is "0", the transmission code changes from "0" to "1" in the midst of the bit block and when an original code is "1", the transmission code changes from "1" to "0" in the midst of the bit block.

In the AMI code, the bandwidth required for transmission is narrow and the DC balance is good, therefore there is a merit that this code causes little distortion on transmission lines. The code changes nearly a boundary between two bit blocks, and the transients mixedly include positive and negative directions and show not line spectrum but non-line spectrum (continuous spectrum). In order to extract clock the AMI code received should be rectified to convert into unipolar RZ (return to zero) code which has rising edges in the midsts of all "1s" of original codes and trailing edges at the ends of the same codes, and has line spectra, therefore it is possible to extract clock pulses. This operation requires automatic threshold control in which the threshold level on a receiver is controled according to amplitude of the receiving pulse train. There is a fault in the AMI code that the clock is unextractable in continuation of "0" codes.

The NRZ code shows non-line spectrum like as the AMI code and has a fault that the clock is unextractable in continuation of "0" or "1" codes.

In order to resolve the abovementioned faults in the AMI and NRZ codes, mBnB code (m binary to n binary code) is employable, wherein m bits of original codes are converted into transmission codes of n bits being greater than m bits. When the mBnB code is employed, transmission codes are transmitted at a rate of n/m times that of original codes, however there are merits that timing information is not disappear, good DC balance is expectable and monitoring operation errors on a transmission line is easy.

Generally the greater the n is, the greater the size of the circuit required in the code conversion is at the rate of the n squared, so that the maximum n is about 8. The CMI and WALSH 1 codes being 1B2B code are actually employed.

Comparing with the CMI code, the WALSH 1 code is a little superior in the required bandwidth, the DC balance and the distortion on transmission lines.

In trailing edges, the CMI code has line spectra of which interval is a period between a bit block and the next that. Observing only rising edges, all transitions in the midst of blocks are at rising edges, so that the CMI has line spectra of which interval is a half period between bit blocks (refer to FIG. 3).

When original codes are random, the WALSH 1 code has the same number of rising edges as that of trailing edges, so that the WALSH 1 code has no line spectrum but non-line spectrum. However, if rising and trailing edges are detected, line spectra are generatable. Even if "0s" or "1s" are continued, therefore clock pulses are extractable like as the CMI code. In case bipolar pulses are employed for the WALSH 1 code and the CMI code, the threshold level fixed to the zero volt is employable to obtain simple receivers.

In the CMI code having line spectra, it is possible to extract clock pulses of the fundamental frequency (repetition frequency of the original code in FIG. 3). However, the WALSH 1 code has no line spectrum so that the clock frequency being extractable is twice of the fundamental frequency differently from the CMI code.

Zero phase and pi phase clock trains consisting of alternate pulses are included in the WALSH 1 code, therefore the zero phase clock train must be selected. The selection of the zero phase clock train has, however, been very difficult. Accordingly, the construction of the clock extraction circuit for the CMI code has been simpler than that for the WALSH 1 code.

The CMI code has, however, line spectra, therefore, it has included the unsolved big problems of radiant noise in comparison with the WALSH 1 code. The line spectrum is about 100 times (equal to value of Q in a radio receiver) as strong as the non-line spectrum, so that the CMI code has large probalities to disturb radio and television bands.

The CMI has some superior merits. However, if the CMI code is employed, the problems of the radiant noise are unavoidable.

SUMMARY OF THE INVENTION

An object of the present invention is to provide an improved digital synchronizing circuit to obtain bit and frame synchronization for transmitting digital signals.

Another object of the invention is to provide a digital synchronizing circuit for employing codes e.g. WALSH 1 having little radiant noise on a transmission line.

A further object of the present invention is to provide a digital synchronizing circuit to accurately separate the zero phase clock from the pi phase clock to obtain a regenerated pulse train wherein those phase clocks are alternately arranged in extracted clock pulses having a frequency twice that of code on a transmission line in the WALSH 1 code.

Other objects, advantages, and features of the present invention will become apparent to those having ordinary skill in the art upon a reading of the following description when taken in conjunction with the accompanying drawings.

BRIEF DESCRIPTION OF THE DRAWINGS

The principle, construction and operation of the present invention will be clearly understood from the following detailed description taken in conjunction with the accompanying drawings, in which:

FIG. 6 is a table of bits showing an example of multi frame;

FIG. 7 is a table of bits showing a receive pulse train;

FIG. 22 is a block diagram illustrating a zero phase separation circuit 17A being an element of the block diagram shown in FIG. 18; and FIG. 23 is a time chart of the zero phase separation circuit 17A.

DESCRIPTION OF THE PREFERRED EMBODIMENTS

Figure 1:
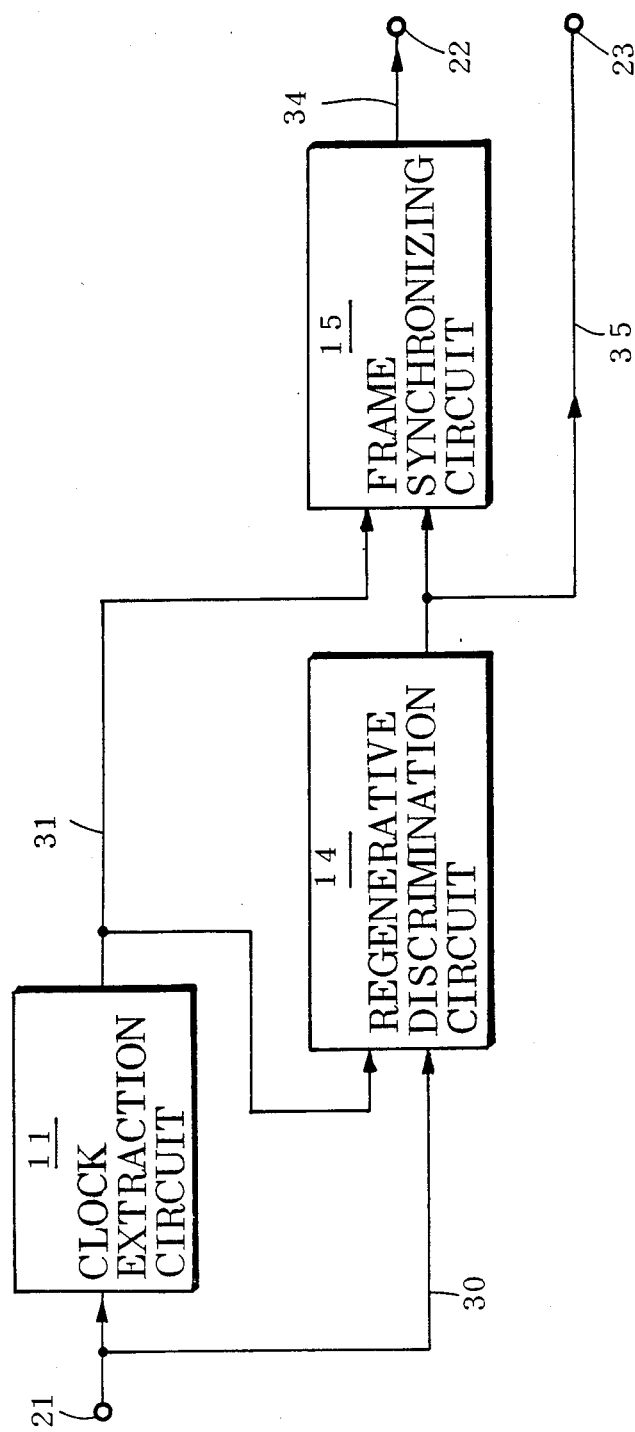
FIG. 1 is a block diagram of a synchronizing circuit of the prior art.
Figure 2:
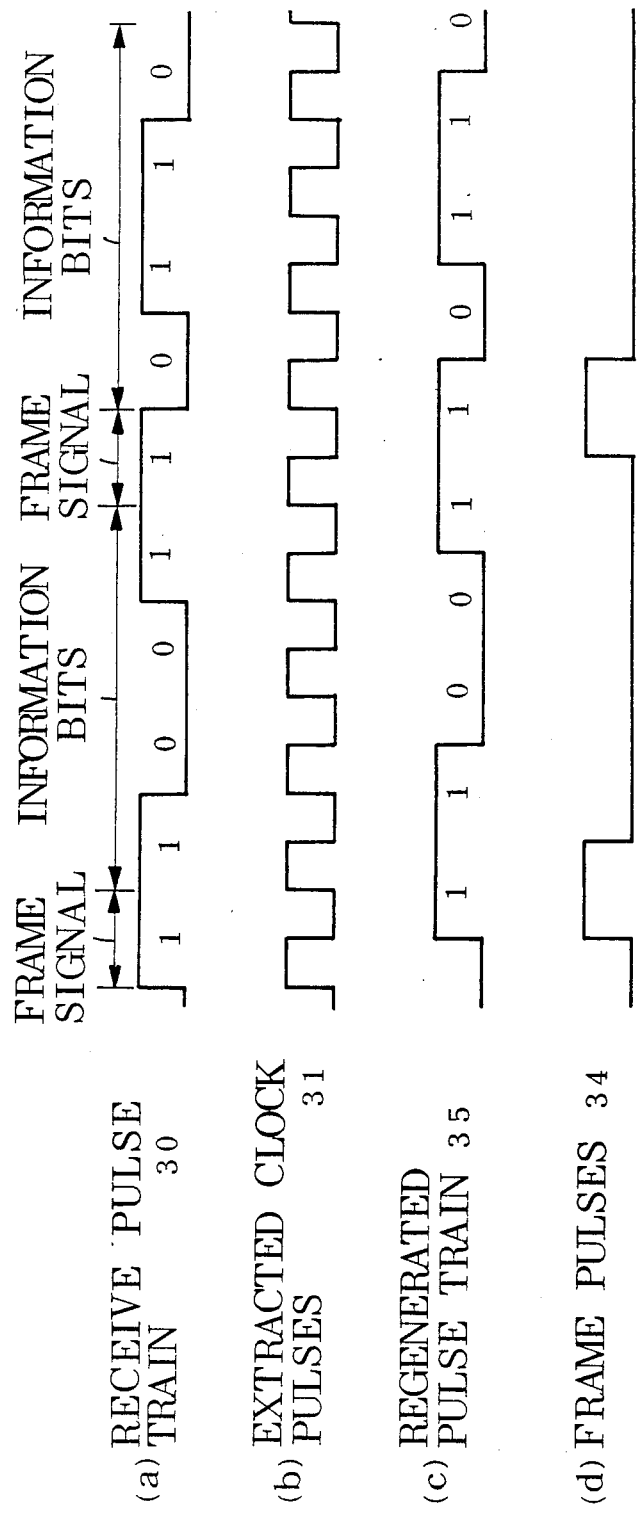
FIG. 2 is a time chart showing waveforms at various portions in the circuit of the prior art of FIG. 1.
Figure 3:
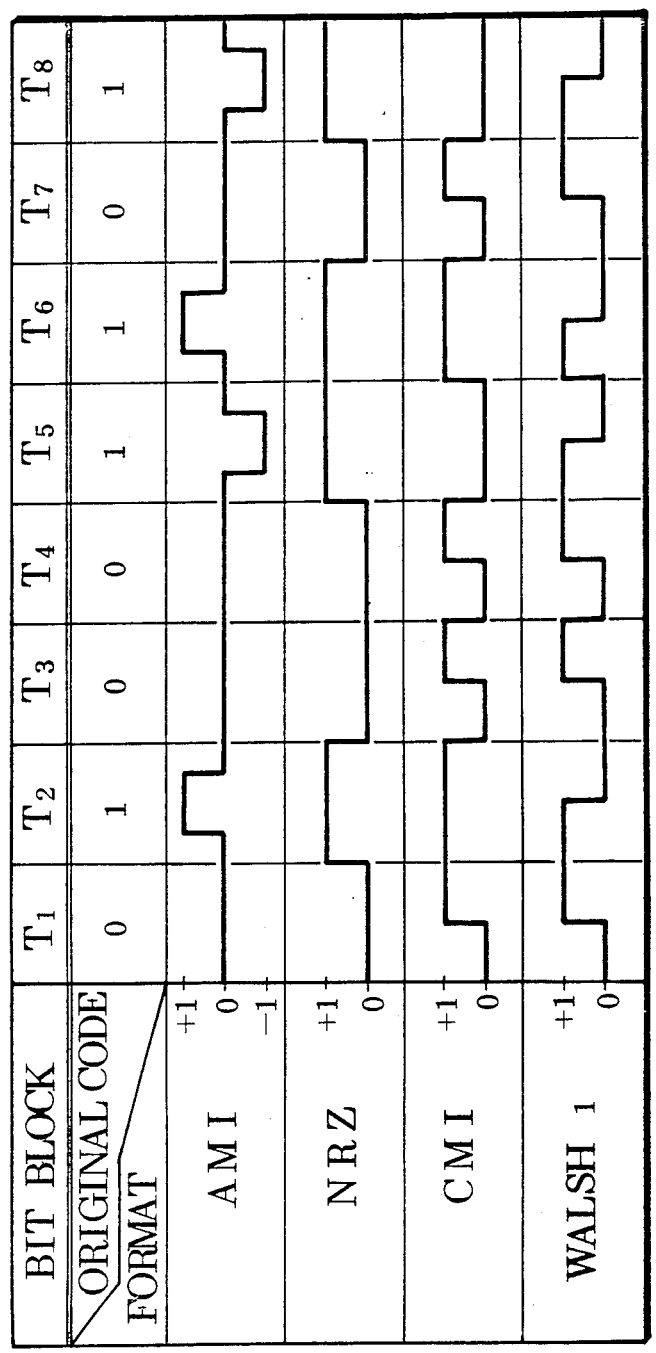
FIG. 3 is a time chart illustrating various codes for transmission in prior art.
Figure 4:
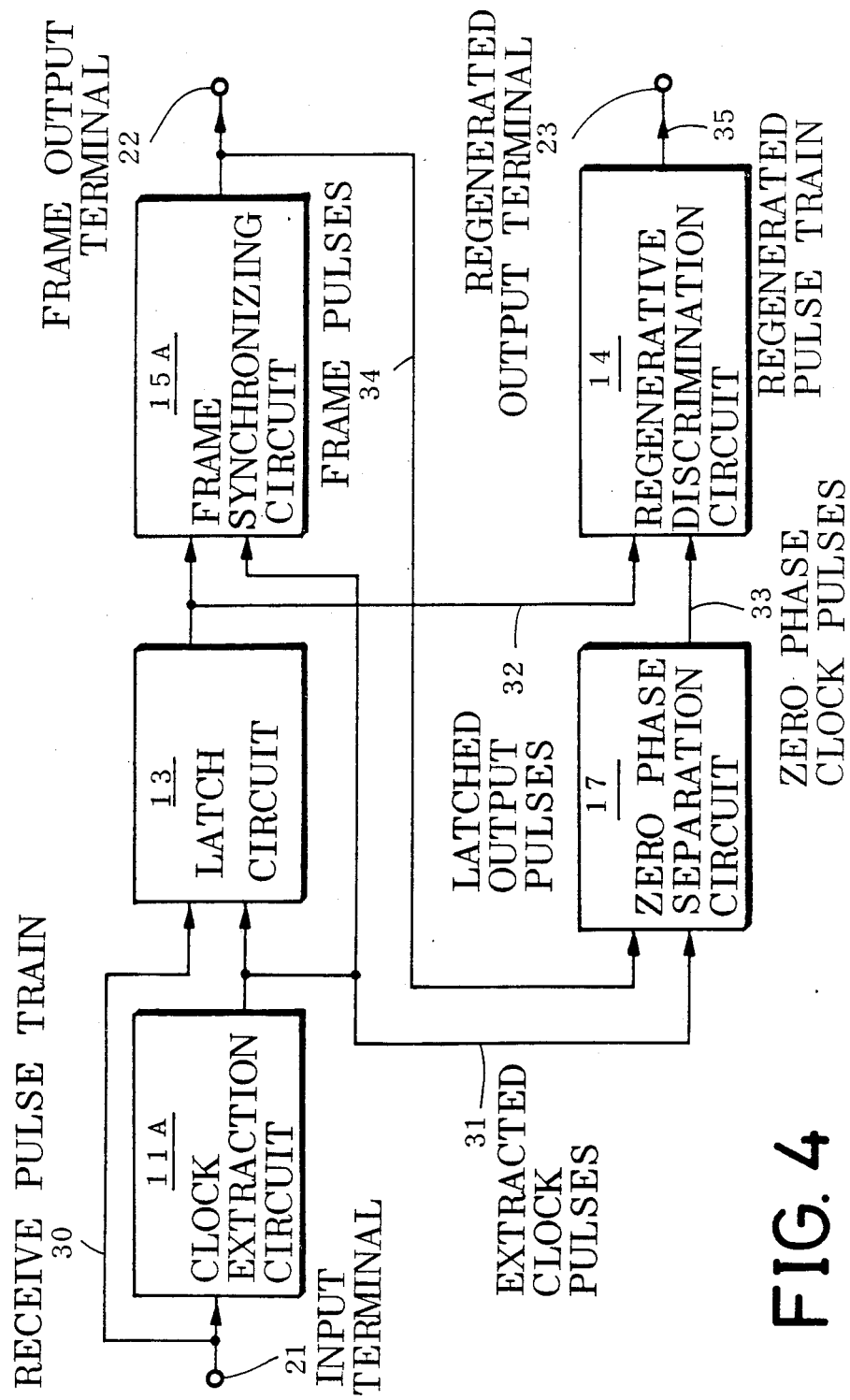
FIG. 4 is a block diagram illustrating an embodiment in accordance with the present invention.

With reference to FIG. 4 showing an embodiment of the present invention constructed as a digital synchronizing circuit being usable in digital communication, reference numeral 11A denotes a clock extraction circuit for extracting extracted clock pulses 31 from a receive pulse train 30 of WALSH 1 code through an input terminal 21 in which frequency ($2f_0$) of the extracted clock pulses 31 is twice that ($f_0$) of codes in the receive pulse train 30.

13 identifies a latch circuit for latching the receive pulse train 30 thereinto by the extracted clock pulses 31 having the frequency $2f_0$ to obtain a latched output pulses 32.

15A denotes a frame synchronizing circuit for receiving the extracted clock pulses 31 and the latched output 32 wherefrom a frame signal is extracted with the extracted clock pulses 31 and for obtaining frame pulses 34 synchronizing with the frame signal at a frame output terminal 22.

17 designates a zero phase separation circuit for obtaining zero phase clock pulses 33 from the extracted clock pulses 31 having the frequency $2f_0$ in which the zero phase clock pulses 33 has the frequency $f_0$ synchronizing with the frame pulses 34.

14 represents regenerative discrimination circuit for regeneratively discriminating contents of the receive pulse train 30 with the zero phase clock pulses and the latched output pulses 32 to deliver a regenerated pulse train 35 representing the original code to a regenerated output terminal 23.

Figure 5:
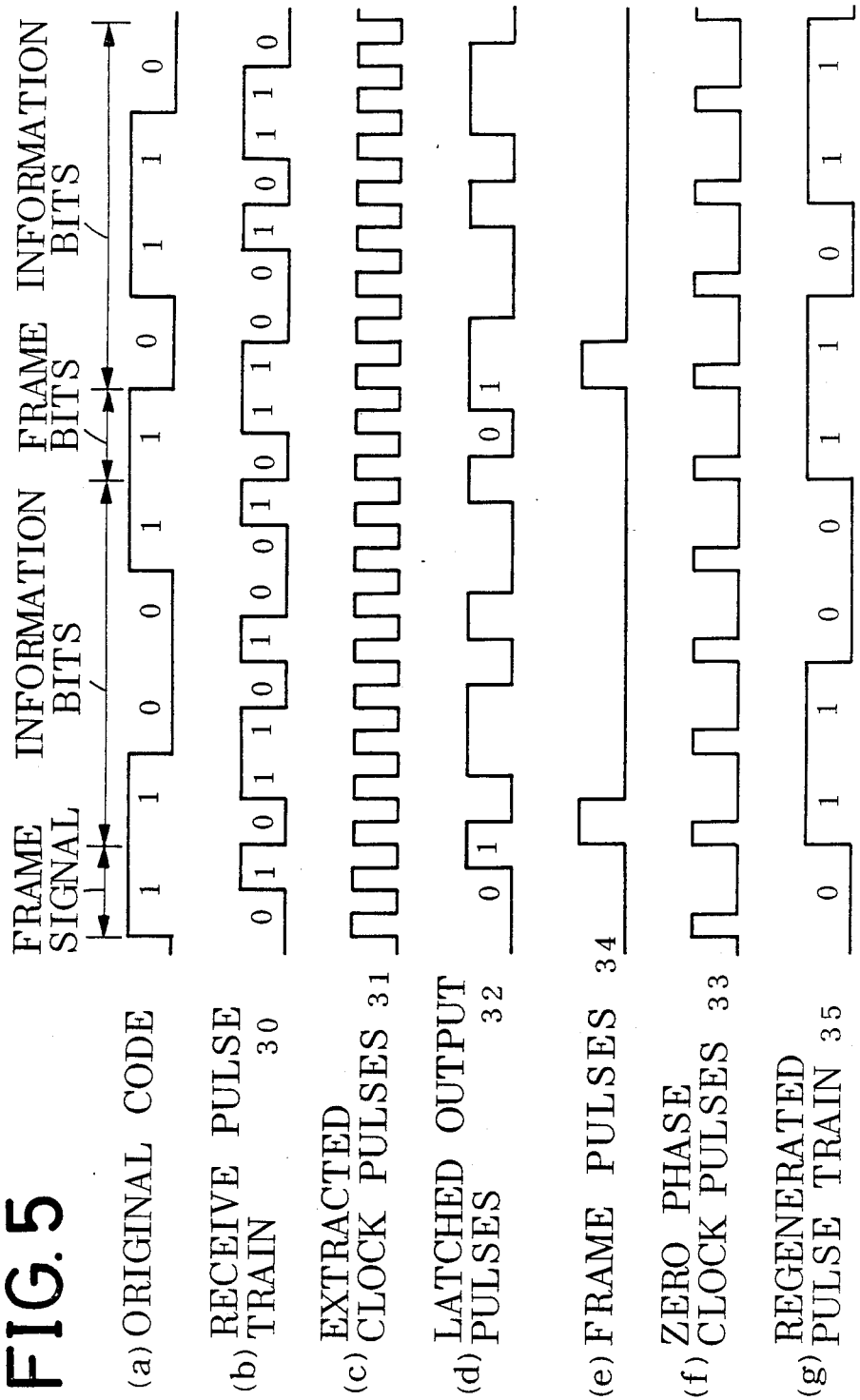
FIG. 5 is a time chart illustrating waveforms at various portions in the block diagram of FIG. 4.

A time chart is illustrated in FIG. 5 to explain the operation of the block diagram of FIG. 4.

In FIG. 5 (a), the original code to be transmitted which is expressed as "0" or "1" is represented in terms of NRZ code. Frame signals are shown as "1, ---1, ---" and information bits are illustrated by 4 bits as an example.

In FIG. 5 (b), WALSH 1 code expressed as "0s" or "1s" is illustrated by waveform of terms of NRZ code and is used as a receive pulse train 30 having code frequency of $f_0$ to transmit the original code shown in (a). The receive pulse train 30 is sent to the clock extraction circuit 11A which extracts extracted clock pulses 31 shown in (c). The extracted clock pulses 31 have a repetition frequency of $2f_0$ being twice that of codes in the receive pulse train 30. The extracted clock pulses 31 are generated by both leading and trailing edges of the receive pulse train 30.

The latch circuit 13 latches the receive pulse train 30 with the extracted clock pulses 31 shown in (c) to deliver latched output pulses 32 shown in (d).

The frame synchronizing circuit 15A inputted the extracted clock pulses 31 and latched output pulses 32 sends out frame pulses 34 shown in (e) synchronizing with each "0, 1" of frame signals in the latched output pulses 32 of (d) which are converted to WALSH 1 code.

Zero phase clock pulses and pi phase clock pulses are alternately arranged in the extracted clock pulses 31 shown in (c). Therefore, the zero phase separation circuit 17 separates zero phase clock pulses 33 of (f) synchronizing with rising edges of frame pulses 34 from the extracted clock pulses 31.

The regenerative discrimination circuit 14 receiving the zero phase clock pulses 33 and latched output pulses 32 of (d) delivers regenerated pulse train 35 shown in (g) so that the original code of (a) can be regenerated.

In FIG. 5, each "0, 1" of the latched output pulses 32 of (d) is used as the frame signal, however "1" of each "0,1" may obviously be used to synchronously obtain frame pulses therewith, too.

More bits can be assigned to a frame signal. In case the frame signal structure is simple as illustratively shown in FIG. 5, when the same pattern as the frame signals appears in the information bits at the same repetition rate as the frame signals, malfunction can occur in synchronization. The more bits assigned to a frame signal effectively operate to guard from the malfunction.

A multi frame structure which employs frame signals having such many bits is illustrated in FIG. 6.

The multi frame structure illustratively consists of 16 frames from $F_0$ to $F_{15}$ which include frame signals of from "0,0,0,0," to "1,1,1,1,". Every group of information bits follows every frame signal.

In case the multi frame structure of FIG. 6 being employed, the same signal as the frame signals of the codes and the rates shown in FIG. 6 rarely appears so that stable synchronization is obtainable.

If the frame signals of the original code are defined as "1, ---0, ---1, ---0" shown in FIG. 7, the frame signals in the receive pulse train 30 converted to the WALSH 1 code are represented as "0,1, ---1,0, ---0,1, ---1,0". Watching the only first codes of the frame signals in the receive pulse train 30 as targets to be synchronized with, "0, ---1, ---0, ---1" are observable. In like manner, watching the only second codes of the same as targets for synchronizing with, "1, ---0, ---1, ---0" are observable. Both series of the first codes and the second codes are same, therefore zero phase is indistinguishable from pi phase. It must accordingly be avoided that both series of the first codes and the second codes are unacceptably same in the receive pulse train 30 as shown in FIG. 7.

Embodiments of each constructive element shown in FIG. 4 will be illustrated as follows.

Figure 8:
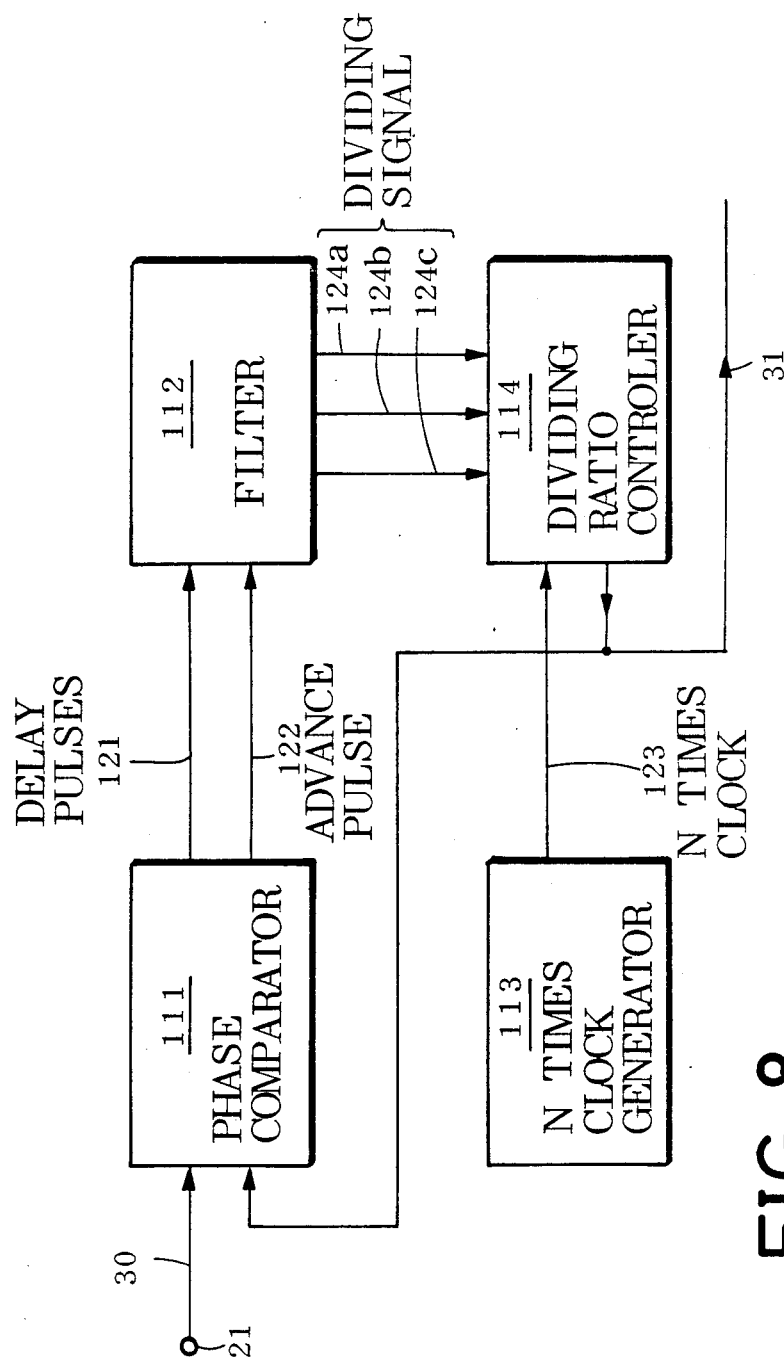
FIGS. 8 and 9 are respectively a block diagram and a time chart of a clock extraction circuit being an element of the present invention.

FIG. 8 shows the detailed block diagram of the clock extraction circuit 11A. 111 indicates a phase comparator for comparing the phases of the receive pulse train 30 and the extracted clock pulses 31 to generate a delay pulse 121 when the extracted clock pulses 31 delay, and an advance pulse 122 when those advance. 112 identifies a filter employing an updown counter or a racing counter. When the delay pulse 121 is inputted, the filter 112 counts down and when the advance pulse is inputted, the same counts up. When counted number exceeds a predetermined negative number to the negative direction, the filter 112 delivers a dividing signal 124a and the counted number is reset. When the counted number exceeds a predetermined positive number to the positive direction, the filter 112 delivers a dividing signal 124c and the counted number is reset. When the counted number does not exceed both predetermined numbers, the filter 112 delivers a dividing signal 124b.

113 denotes a N times clock generator for generating a clock having a repetition frequency of $2Nf_0$, wherein $f_0$ means a repetition frequency of codes of the receive pulse train 30 and a repetition frequency of the extracted clock pulses 31 is $2f_0$.

114 designates a dividing ratio controller for delivering the extracted clock pulses 31 which are pulses divided from the N times clock 123 by a dividing ratio. When the dividing signal 124a is inputted, the dividing ratio of the controller 114 is $N-1$, when the dividing signal 124b is inputted, that is N, and when the dividing signal 124c is inputted, that is $N+1$.

Figure 9:
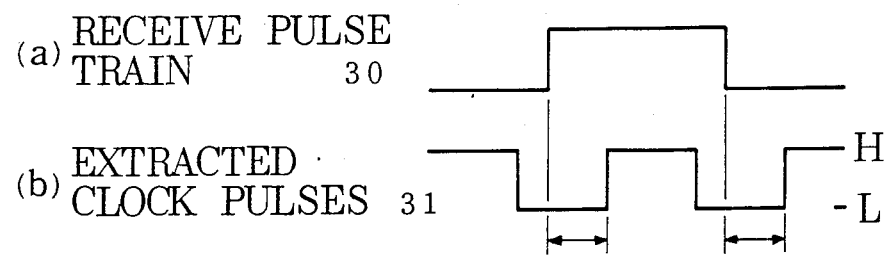

A time chart showing an operation of the phase comparator 111 shown in FIG. 8 is illustrated in FIG. 9.

A pulse of receive pulse train 30 is shown in (a) and the extracted clock pulses 31 are shown in (b) of FIG. 9. The extracted clock pulses 31 are sampled by rising and trailing edges of the receive pulse train 30. If the sampled extracted clock pulse 31 is "L", the extracted clock pulses 31 have delayed from the receive pulse train 30 by the phase of the time shown with arrows in (b) so that the delay pulse 121 is delivered.

If the sampled extracted clock pulse 31 is "H", the extracted clock pulses 31 have advanced from the receive pulse train 30 in phase, so that the advance pulse 122 is delivered.

Receiving the delay pulse 121 or the advance pulse 122, the filter 112 counts-down or counts-up so that the filter 112 has a function of integration. As the result of the integration, if the counted number exceeds a predetermined negative number to the negative direction, it means that the repetition frequency of the extracted clock pulses 31 is lower than $2f_0$ so that the dividing signal 124a is delivered. Accordingly, the dividing ratio is set on N−1. The repetition frequency of the extracted clock pulses 31, therefore, becomes higher.

If the counted number in the filter 112 exceeds a predetermined positive number to the positive direction, it means that the repetition frequency of the extracted clock pulses 31 is higher than $2f_0$ so that the dividing signal 124c is delivered. Accordingly, the dividing ratio is set on N+1. The repetition frequency of the extracted clock pulses 31, therefore, becomes lower.

If the counted number in the filter 112 does not exceeds both predetermined numbers, it means that the repetition frequency of the extracted clock pulses 31 is $2f_0$ so that the dividing signal 124b is delivered. Accordingly, the dividing ratio is set on N. The repetition frequency of the extracted clock pulses 31 is kept being $2f_0$.

In this manner, the extracted clock pulses 31 having the repetition frequency of $2f_0$ synchronously with the receive pulse train 30 of which repetition frequency is $f_0$ are extracted. The greater the number of N is, the smaller steps the repetition frequency can be varied by. When the number of N varies by one, it is obvious that the phase of the extracted clock pulses 31 can advance or delay by $\frac{1}{2}Nf_0$. For instance a number of 16 or 32 can be chosen as the number of N.

Figure 10:
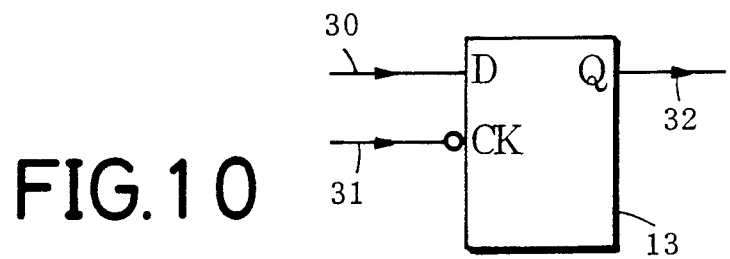
FIG. 10 shows a latch circuit being an element of the present invention.

FIG. 10 shows the latch circuit 13 which consists of e.g. a D flip-flop latching the receive pulse train 30 with every extracted clock pulse 31 to deliver latched output pulses 32 (refer to (b), (c) and (d) of FIG. 5).

Figure 11:
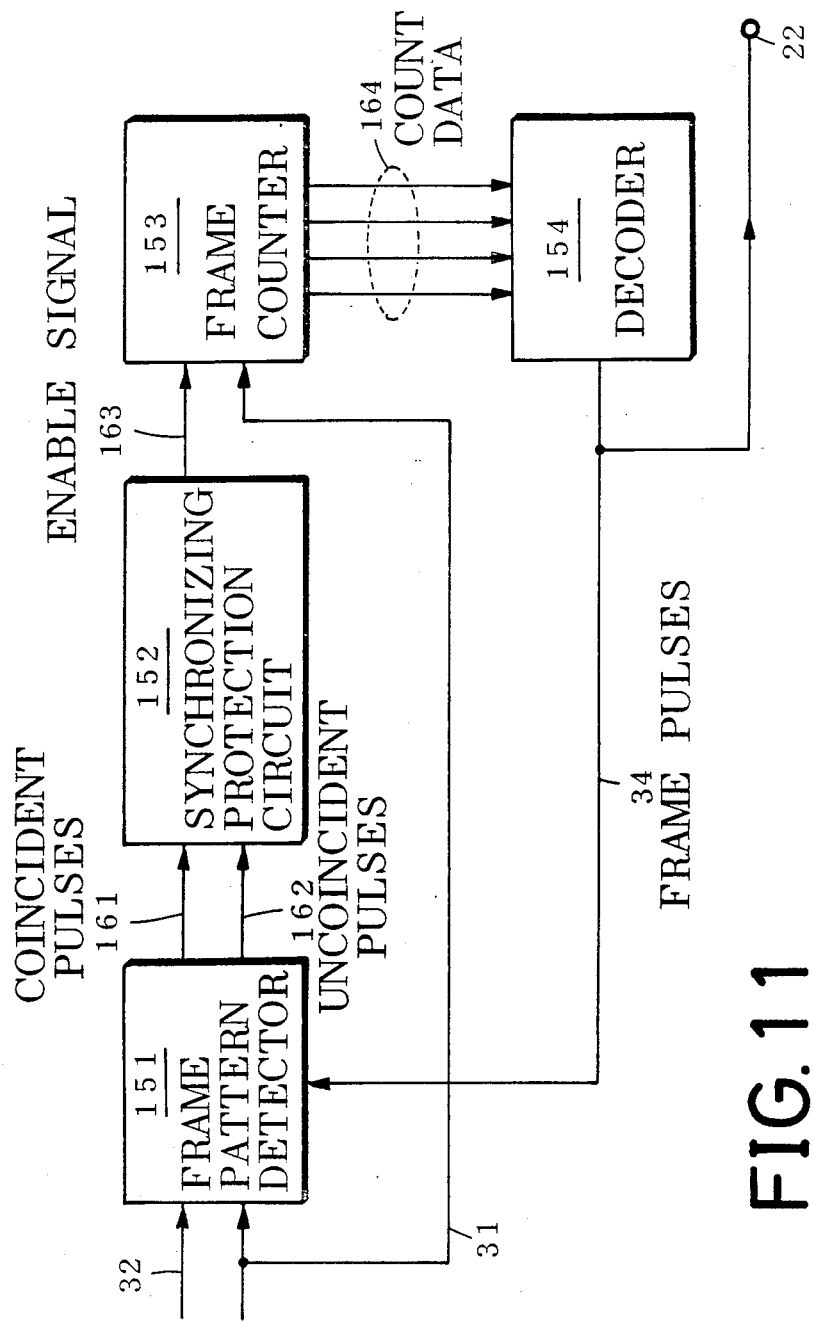
FIG. 11 is a block diagram illustrating a frame synchronizing circuit being an element of the invention.

A block diagram of an embodiment of the frame synchronizing circuit 15A is illustrated in FIG. 11. 151 represents a frame pattern detector which is inputted the latched output pulses 32 and the extracted clock pulses 31. Every frame pulse 34 being added, the frame pattern detector 151 judges whether a pattern being coincident with a predetermined frame pattern can be detected or not in the latched output pulses 32. When detected, a coincident pulse 161 is delivered and when not detected, an uncoincident pulse 162 is delivered.

152 shows a synchronizing protection circuit which includes a filter having an updown counter or a racing counter. When the coincident pulse 161 is added, the synchronizing protection circuit 152 delivers an enable signal 163 which shows a enabled state. When the uncoincident pulse 162 is added, the circuit 152 delivers an enable signal 163 which shows a disabled state. When both pulses 161 and 162 are not added, the circuit 152 delivers an enable signal 163 which shows an enabled state.

153 refers to a frame counter which includes a ring counter for counting repetition rate of a frame signal. When the enable signal 163 shows an enabled state, the extracted clock pulses 31 are counted and when the enable signal 163 shows a disabled state, the frame counter 153 does not count.

154 indicates a decoder. The decoder 154 inputted count data 164 being the output of the frame counter 153 delivers a frame pulse 34 while the count data 164 shows zero.

Figure 12:
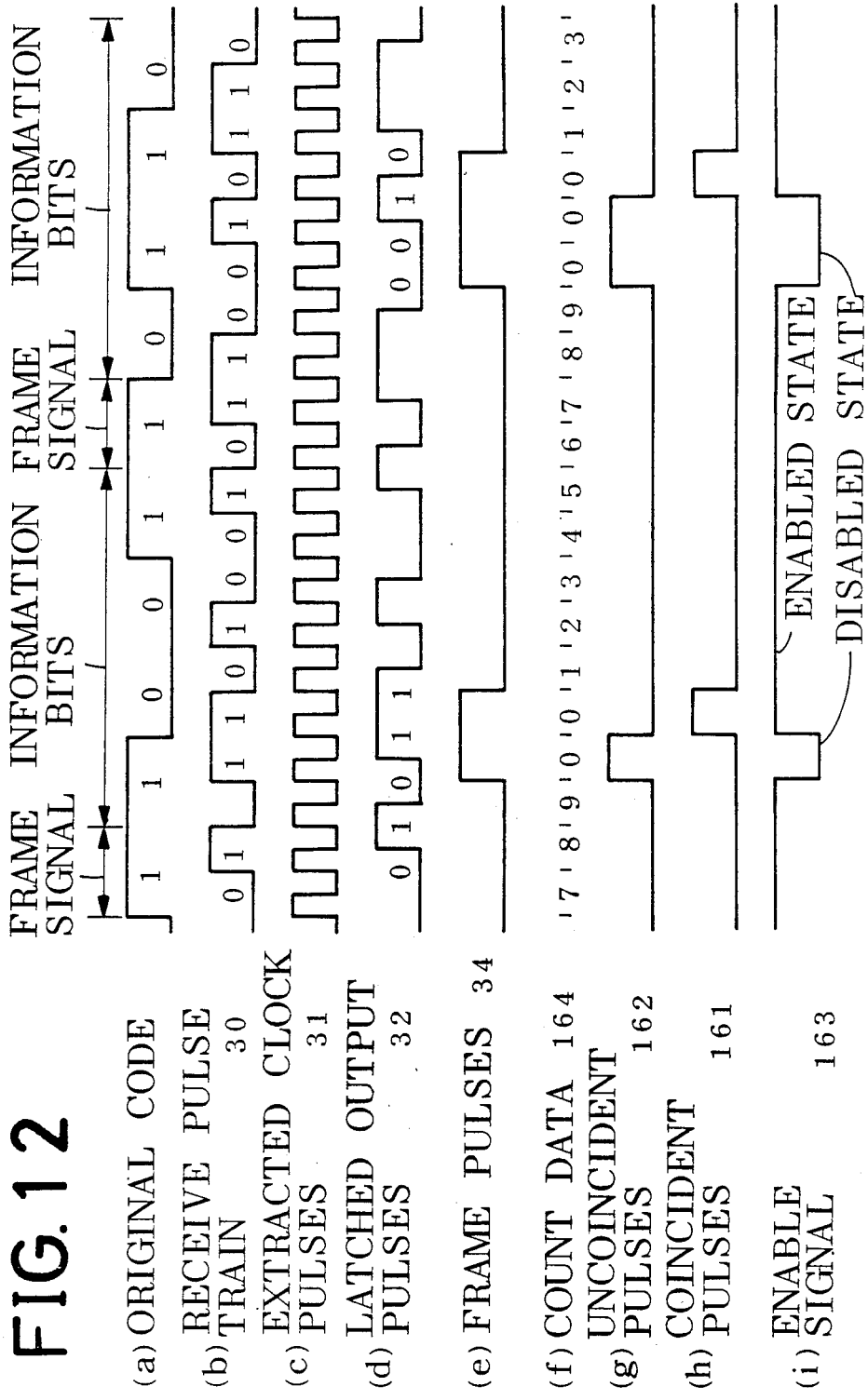
FIGS. 12 and 13 are time charts of the frame synchronizing circuit.
Figures 13, 14:
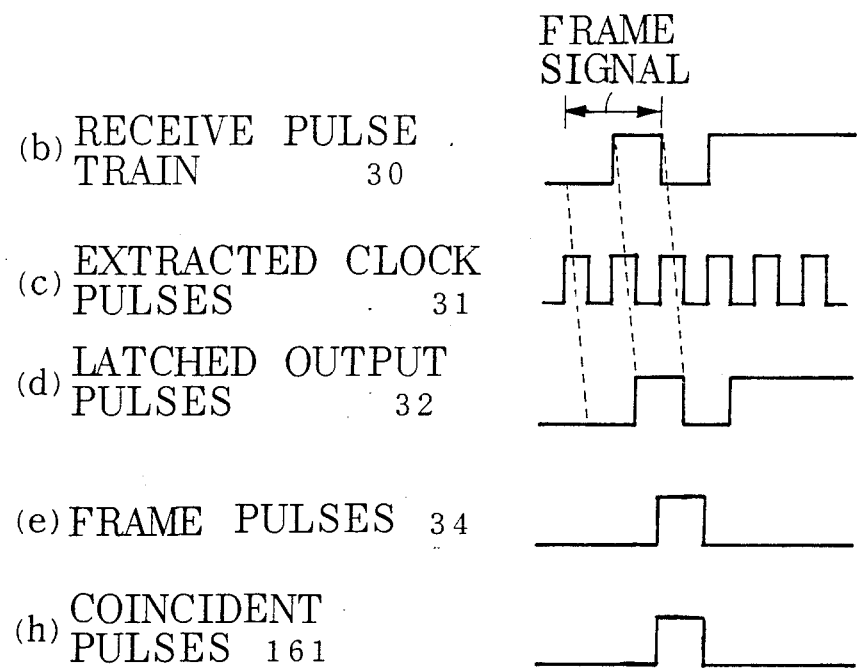
FIG. 14 is a table illustrating states of the frame synchronizing circuit.

FIGS. 12 and 13 are time charts for illustrating operation of the frame synchronizing circuit 15A shown in FIG. 11, wherein FIG. 12 shows an unsynchronized state and FIG. 13 shows a synchronized state.

The frame pattern detector 151 is inputted the latched output pulses 32 shown in (d). When the frame pulse 34 shown in (e) is added, the frame pattern detector 151 detects whether or not the frame pulse 34 has coincidence with each frame signal shown as "0, 1" in (d).

In FIG. 12, when count data 164 of (f) show zero, the frame pulse 34 is delivered. When the frame pulse 34 rises up, the latched output pulse 32 of (d) is not "1", therefore uncoincident pulse 162 shown in (g) is delivered. After that, when the latched output pulse 32 of (d) becomes "1", the coincident pulse 161 shown in (h) is delivered so that the count data 164 of (f) start showing data counted from 0 to 9. When the count data 164 does not show zero, the frame pulse 34 of (e) is ended. While the uncoincident pulses 162 of (g) are delivered, the enable signal 163 of (i) shows disabled state. When the coincident pulse 161 of (h) is delivered, the enable signal 163 of (i) shows enabled state and the enabled state is continuously kept even if the coincident pulse 161 of (h) is ended.

While the enable signal 163 of (i) shows disabled state, the frame counter 153 does not start counting the extracted clock pulses 31 of (c). The frame pulse 34 of (e) is continuously shifted until the frame pattern detector 151 detects a predetermined frame pattern in the receive pulse train 30 of (b) based on the original code of (a). In the state that the uncoincident pulse 162 of (g) is not delivered, the synchronized state is obtained as shown in FIG. 13, therefore the frame pulse 34 of (e) in FIG. 13 perfectly coincides with the code of "1" of the frame signal in the latched output pulses 32 of (d).

In such an operation, relationships between the coincident pulses 161, the uncoincident pulses 162 and the enable signal 163 in the synchronizing protection circuit 152 are respectively shown as the synchronized state and the unsynchronized state in FIG. 14.

In FIGS. 12 and 13, a case of a single frame pattern is shown and e.g. in FIG. 6, a case of multi frame pattern is shown. It is believed obvious from the above-description that whichever frame pattern is used, the preset frame pattern can be detected by presetting the frame pattern into the frame pattern detector 151.

Figure 15:
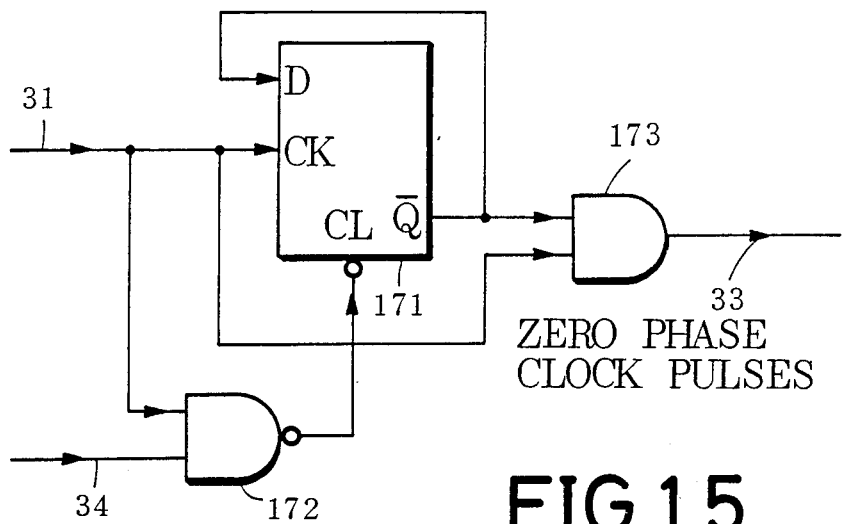
FIG. 15 is a block diagram illustrating a zero phase separation circuit being an element of the invention.
Figure 16:
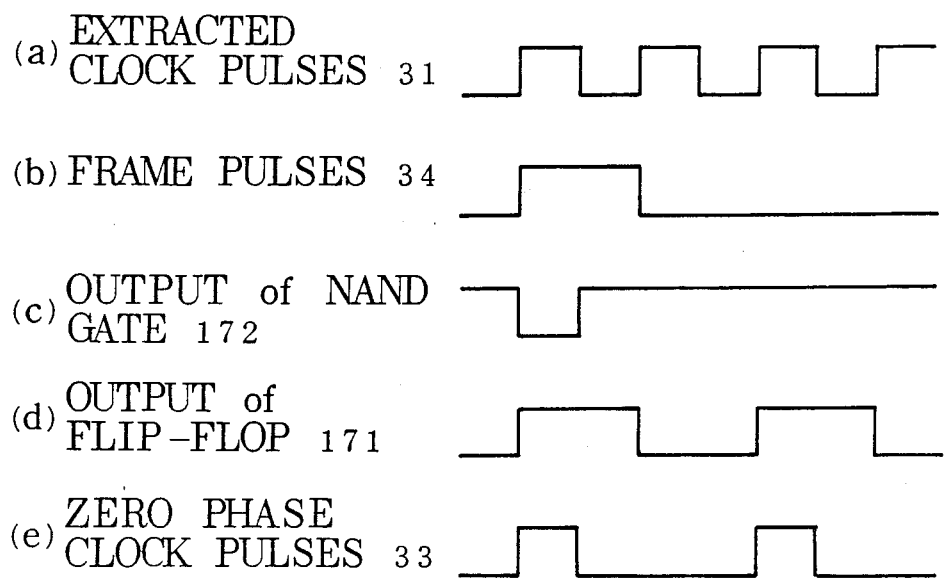
FIG. 16 is a time chart of the zero phase separation circuit.

A block diagram and a time chart of its operation of an embodiment of the zero phase separation circuit 17 are respectively illustrated in FIGS. 15 and 16. 171 identifies a flip-flop, 172 denotes a NAND gate and 173 designates an AND gate. The output (c) of the NAND gate 172 inputted with the extracted clock pulses 31 of (a) and the frame pulses 34 of (b) in FIG. 16 makes the flip-flop 171 clear. When the extracted clock pulses 31 of (a) are inputted, the flip-flop 171 delivers the output shown in (d) of FIG. 16. The extracted clock pulses 31 of (a) and the output (d) of the flip-flop 171 are ANDed in the AND gate 173 to deliver zero phase clock pulses 33 of (e). Thus the zero phase clock pulses 33 can be separated from the pi phase clock pulses.

Figure 17:
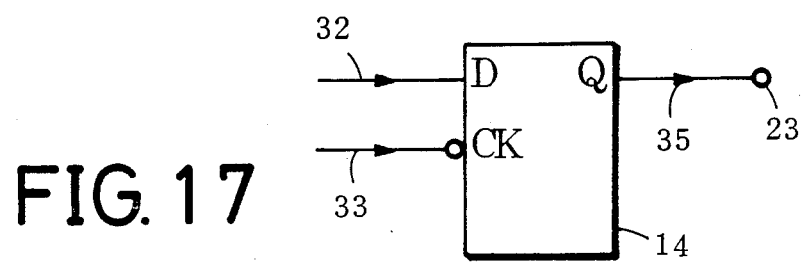
FIG. 17 shows a regenerative discrimination circuit being an element of the invention.

FIG. 17 shows a regenerative discrimination circuit 14 which consists of e.g. a D flip-flop. The regenerative discrimination circuit 14 latches the latched output pulses 32 of (d) in FIG. 5 at every input of zero phase clock pulses 33 of (f) in FIG. 5 and delivers the regenerated pulse train 35 of (g) in FIG. 5 to the regenerated output terminal 23.

Another embodiment of the present invention is shown in from FIGS. 18 to 23, wherein the reference numerals are the same as those of FIG. 4. It is different from the block diagram shown in FIG. 4 that the latch circuit 13 is omitted in FIG. 18. Therefore the receive pulse train 30 is directly inputted to the frame synchronizing circuit 15A and the regenerative discrimination circuit 14 without passing through the latch circuit 13.

Figure 18:
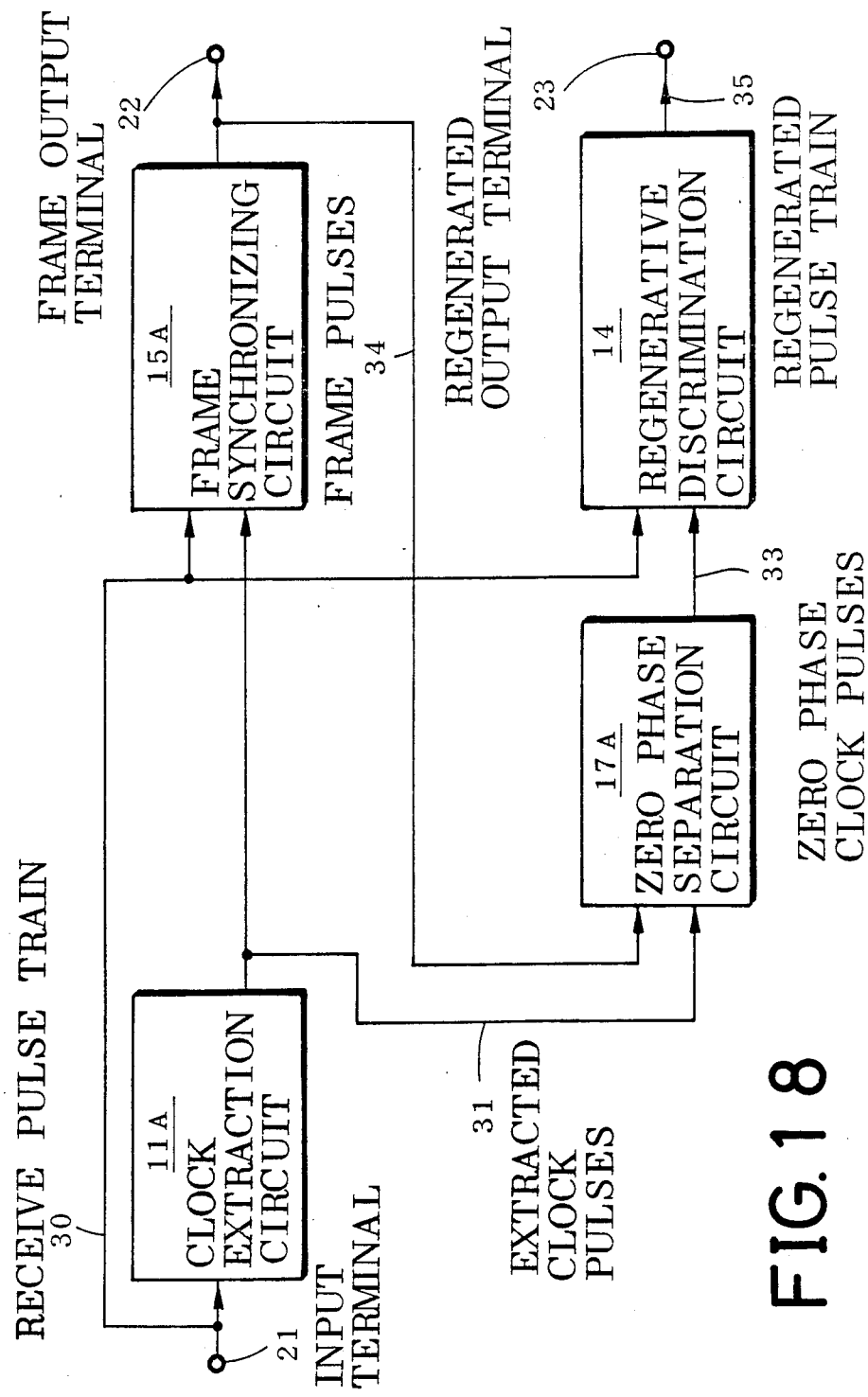
FIG. 18 is a block diagram illustrating another embodiment in accordance with the present invention.
Figure 19:
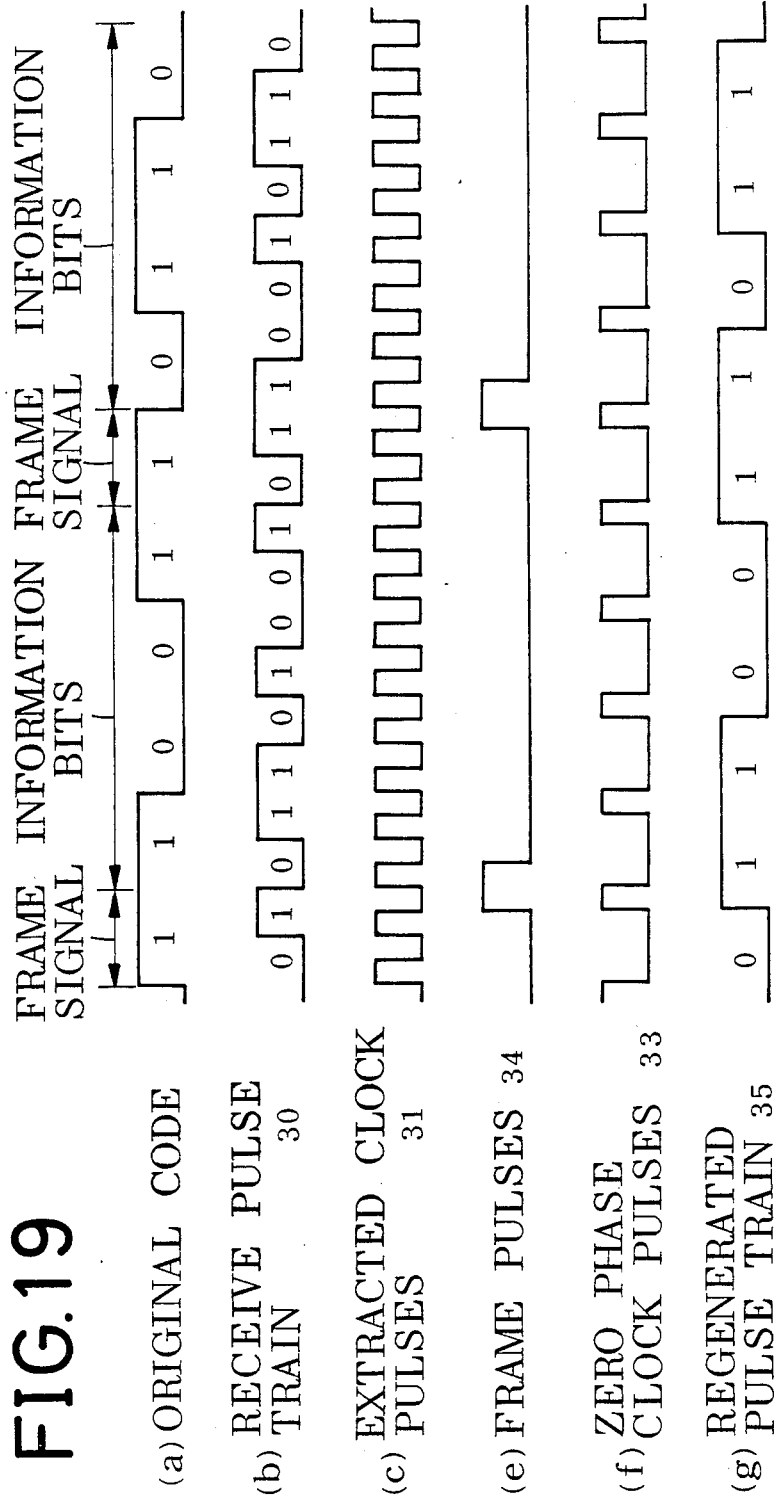
FIG. 19 is a time chart illustrating waveforms at various portions in the block diagram of FIG. 18.

FIG. 19 is a time chart illustrating waveforms at various portions in the block diagram of FIG. 18 and corresponding with the time chart shown in FIG. 5. It is different from a time chart shown in FIG. 5 that frame pulses 34 of (e), zero phase clock pulses 33 of (f) and a regenerated pulse train 35 of (g) shown in FIG. 19 respectively progress in phase from those of FIG. 5 by a half period of the extracted clock pulses 31 of (c), because the latched output pulses 32 of the latch circuit 13 in FIG. 4 are delayed in phase from the receive pulse train 30 by a half period of the extracted clock pulses 31.

The multi frame as shown in FIG. 6 is usable in a block diagram of FIG. 18 in the same way as that of FIG. 4.

The clock extraction circuit 11A, regenerative discrimination circuit 14 and frame synchronizing circuit 15A are the same elements as those shown in FIG. 4.

The detailed block diagram of the clock extraction circuit 11A is illustrated in FIG. 8 and its time chart is shown in FIG. 9.

The detailed block diagram of the frame synchronizing circuit 15A is illustrated in FIG. 11 wherein the latched output pulses 32 are replaced by the receive pulse train 30. Its time chart in unsynchronized state is shown in FIG. 20 and its time chart in synchronized state is shown in FIG. 21.

Figure 20:
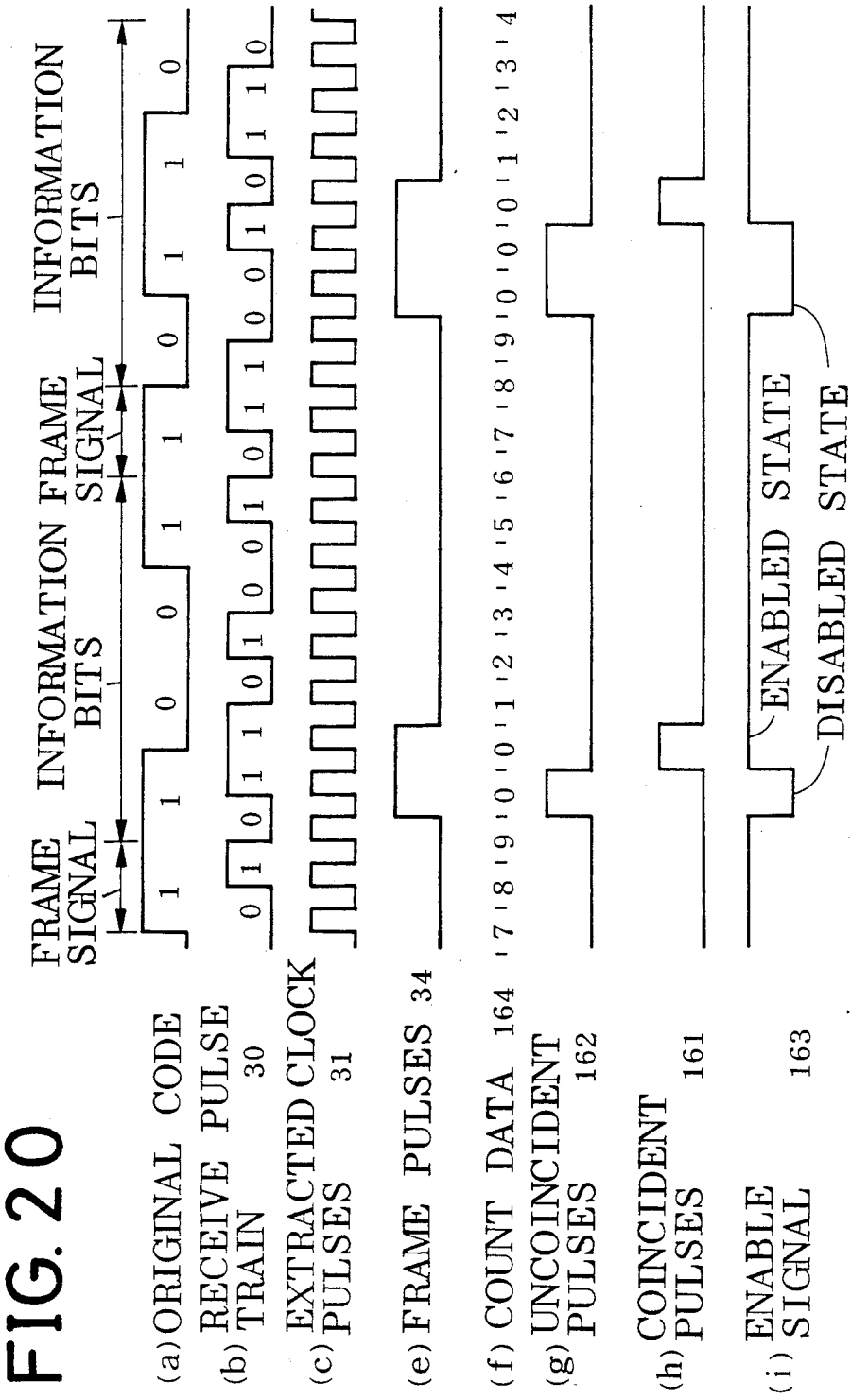
FIGS. 20 and 21 are time charts of the frame synchronizing circuit 15A being an element of the block diagram shown in FIG. 18.

It is different from the time chart shown in FIG. 12 corresponding with FIG. 20 that frame pulses 34 of (e), count data 164 of (f), uncoincident pulses 162 of (g), coincident pulses 161 of (h) and an enable signal 163 of (i) shown in FIG. 20 respectively progress in phase from those shown in FIG. 12 by a half period of the extracted clock pulses 31 of (c).

Figure 21:
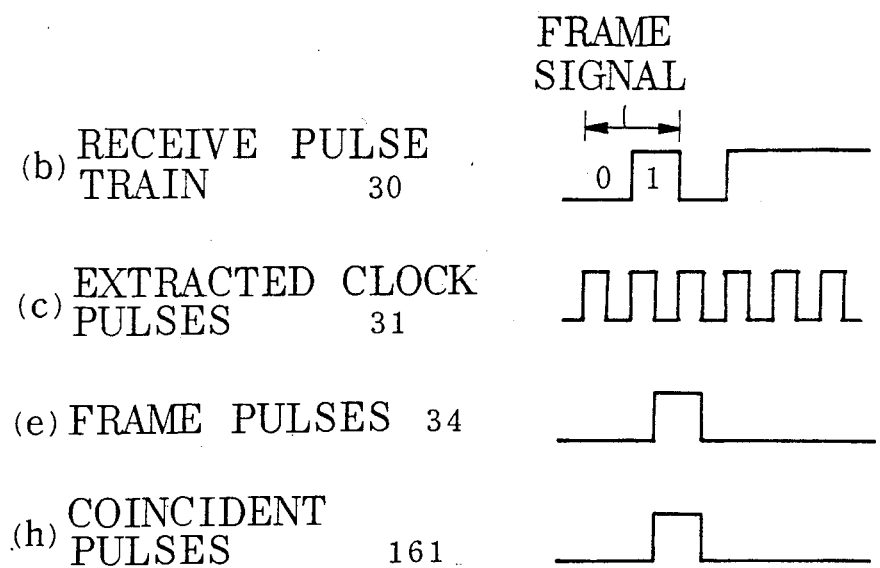

It is different from the time chart shown in FIG. 13 corresponding with FIG. 21 that frame pulses 34 of (e) and coincident pulses 161 of (h) shown in FIG. 21 respectively progress in phase from those shown in FIG. 13 by a half period of the extracted clock pulses 31 of (c).

A detailed block diagram of a zero phase separation circuit 17A shown in FIG. 18 is illustrated in FIG. 22. It is different from the block diagram shown in FIG. 15 that extracted clock pulses 31 are applied to a flip-flop 171 and a NAND gate 172 via an invertor 174.

FIG. 23 corresponding with FIG. 16 is a time chart of the zero phase separation circuit 17A shown in FIG. 22. It is different from the time chart shown in FIG. 16 that an output of the invertor 174 is shown in (a) of FIG. 23 in stead of the extracted clock pulses 31 in (a) of FIG. 16.

A detailed circuit of a regenerative discrimination circuit 14 shown in FIG. 18 is illustrated in FIG. 17 wherein the latched output pulses 32 are replaced by the receive pulse train 30.

It is obvious from the abovementioned that the latch circuit 13 shown in FIG. 4 is omitted in FIG. 18, therefore the embodiment of FIG. 18 can operate faster by a half period of the extracted clock pulses 31 than that of FIG. 4.

As has been described hereinbefore, according to the present invention, the WALSH 1 code having very low radiant noise on a transmission line is employed. The WALSH 1 code has the problem of the zero phase clock and the pi phase clock. In the present invention, both clocks can accurately be separated with the simple circuit.

While the preferred form of the present invention has been described, it is to be understood that modifications will be apparent those skilled in the art without departing from the spirit of the invention.

The scope of the invention, therefore, is to be determined solely by the following claims.

What is claimed is:

1. A digital synchronizing circuit comprising:
   clock extraction means for extracting clock pulses and delivering extracted clock pulses having a repetition frequency of n/m times that of codes in a receive pulse train which has no line spectrum on a transmission line for random signals and is converted from an original code of m bits to a code of n bits, wherein the number of n is greater than that of m;
   latch means for latching said receive pulse train according to said extracted clock pulses and for delivering latched output pulses;
   frame synchronizing means for receiving said extracted clock pulses and said latched output pulses and for extracting therefrom frame pulses, including means for detecting if the extracted of said latched output pulses in successive frames have a predetermined frame pattern, and if so, delivering to an output of said digital synchronizing circuit said extracted of said latched output pulses synchronized with a frame signal included in said latched output pulses, and if not, shifting which of said latched output pulses are extracted in successive frames until said predetermined pattern is detected;
   zero phase separation means for separating a zero phase clock signal from said extracted clock pulses which alternately consists of said zero phase clock signal and a pi phase clock signal; and
   regenerative discrimination means for regenerating said original code by receiving said latched output pulses and said zero phase clock signal.

2. A digital synchronizing circuit as claimed in claim 1, wherein said receive pulse train consists of WALSH 1 code.

3. A digital synchronizing circuit as claimed in claim 1, wherein said clock extraction means comprises:
   phase comparing means for comparing phases of said receive pulse train and said extracted clock pulses by judging whether edges of said receive pulse train sample a low level of said extracted clock pulses or a high level of those and for delivering a delay pulse or an advance pulse corresponding with every said judging;
   filtering means for detecting when a difference between the number of said delay pulses and the number of said advance pulses is over a predetermined positive number and, if so, producing a first dividing signal, for detecting when said difference is over a predetermined negative number and, if so, producing a third dividing signal, and for detecting when said difference is between both said predetermined numbers and, if so, producing a second dividing signal;
   N times clock generating means for generating an N times clock signal having a repetition frequency of N times that of said extracted clock pulses when said extracted clock pulses are synchronized with said receive pulse train; and
   dividing ratio controlling means for delivering said extracted clock pulses by dividing said N times clock signal at a dividing ratio, wherein said dividing ratio is N−1 when receiving said first dividing signal, said dividing ratio is N when receiving said second dividing signal and said dividing ratio is N+1 when receiving said third dividing signal.

4. A digital synchronizing circuit as claimed in claim 1, wherein said frame synchronizing means comprises:
frame pattern detecting means having inputted thereto said latched output pulses and said extracted clock pulses for delivering an uncoincident pulse when a pattern coincident with said predetermined frame pattern is not detected in said latched output pulses by judging at every input of said extracted clock pulses during a presence of said frame pulse, and for delivering a coincident pulse when a pattern coincident with said predetermined frame pattern is detected in said latched output pulses by judging at every input of said extracted clock pulses during a presence of said frame pulse;
synchronizing protection means for delivering an enable signal to protect a synchronized state wherein said enable signal indicates a disabled state when said uncoincident pulse in an unsynchronized state is inputted thereto and said enable signal indicates an enabled state except when said uncoincident pulse in said unsynchronized state is inputted thereto;
frame counting means including a ring counter for counting said extracted clock pulses from zero to a predetermined number while said enable signal indicates said enabled state and for keeping a counting number zero while said enable signal indicates said disabled state; and
decoding means for decoding said counting number and for delivering said frame pulses when said counting number is zero in said frame counting means.

5. A digital synchronizing circuit as claimed in claim 4, wherein said predetermined frame pattern detected by said frame pattern detecting means consists of a multi frame pattern.

6. A digital synchronizing circuit as claimed in claim 1, wherein said zero phase separation means comprises:
a first gating means for ANDing said extracted clock pulses and said frame pulses and for delivering a clear signal;
a flip-flop being made clear by receiving said clear signal and which changes output states at every repetition period of said extracted clock pulses; and
a second gating means for ANDing an output of said flip-flop and said extracted clock pulses and for delivering said zero phase clock pulses.

7. A digital synchronizing circuit as claimed in claim 1, wherein said predetermined frame pattern consists of a multi frame pattern.

8. A digital synchronizing circuit comprising:
clock extraction means for extracting clock pulses and delivering extracted clock pulses having a repetition frequency of n/m times that of codes in a receive pulse train which has no line spectrum on a transmission line for random signals and is converted from an original code of m bits to a code of n bits, wherein the number of n is greater than that of m;
frame synchronizing means for receiving said extracted clock pulses and said receive pulse train and for extracting therefrom frame pulses, including means for detecting if the extracted pulses of said receive pulse train in successive frames have a predetermined frame pattern, and if so, delivering to an output of said digital synchronizing circuit said extracted pulses of said receive pulse train synchronized with a frame signal including in said latched output pulses, and if not, shifting which of said pulses in said received pulse train are extracted in successive frames until said predetermined pattern is detected;
zero phase separation means for separating a zero phase clock signal from said extracted clock pulses which alternately consists of said zero phase clock signal and a pi phase clock signal; and
regenerative discrimination means for regenerating said original code by receiving said receive pulse train and said zero phase clock signal.

9. A digital synchronizing circuit as claimed in claim 8, wherein said receive pulse train consists of WALSH 1 code.

10. A digital synchronizing circuit as claimed in claim 8, wherein said clock extraction means comprises:
phase comparing means for comparing phases of said receive pulse train and said extracted clock pulses, by judging whether edges of said receive pulse train sample a low level of said extracted clock pulses or a high level of those and for delivering a delay pulse or an advance pulse corresponding with every said judging;
filtering means for delivering a first dividing signal when a difference between the number of said delay pulses and the number of said advance pulses exceeds a predetermined positive number, a third dividing signal when said difference exceeds a predetermined negative number, and a second dividing signal when said difference is between said both predetermined numbers;
N times clock generating means for generating a N times clock signal having a repetition frequency of N times that of said extracted clock pulses when said extracted clock pulses are synchronized with said receive pulse train; and
dividing ratio controlling means for delivering said extracted clock pulses by dividing said N times clock signal at a dividing ratio, wherein said dividing ratio is N−1 when receiving said first dividing signal, said dividing ratio is N when receiving said second dividing signal and said dividing ratio is N+1 when receiving said third dividing signal.

11. A digital synchronizing circuit as claimed in claim 8, wherein said frame synchronizing means comprises:
frame pattern detecting means having inputted thereto said receive pulse train and said extracted clock pulses for delivering an uncoincident pulse when a pattern coincident with said predetermined frame pattern is not detected in said receive pulse train by judging at every input of said extracted clock pulses during a presence of said frame pulse, and for delivering a coincident pulse when a pattern coincident with said predetermined frame pattern is detected in said receive pulse train by judging at every input of said extracted clock pulses during a presense of said frame pulse;
synchronizing protection means for delivering an enable signal to protect a synchronized state wherein said enable signal indicates a disabled state when said uncoincident pulse in an unsynchronized state is inputted thereto and said enable signal indicates an enabled state except when said uncoincident pulse in said unsynchronized state is inputted thereto;

frame counting means including a ring counter for counting said extracted clock pulses from zero to a predetermined number while said enable signal indicates said enabled state and for keeping a counting number zero while said enable signal indicates said disabled state; and decoding means for decoding said counting number and for delivering said frame pulses when said counting number is reset to zero in said frame counting means.

12. A digital synchronizing circuit as claimed in claim 11, wherein said predetermined frame pattern detected by said frame pattern detecting means consists of a multi frame pattern.

13. A digital synchronizing circuit as claimed in claim 8, wherein said zero phase separation means comprises:

a first gating means for ANDing inverted clock pulses which are obtained by inverting said extracted clock pulses and said frame pulses and for delivering a clear signal;

a flip-flop being made clear by receiving said clear signal and which changes output states at every repetition period of said inverted clock pulses; and a second gating means for ANDing an output of said flip-flop and said inverted clock pulses and for delivering said zero phase clock pulses.

14. A digital synchronizing circuit as claimed in claim 8, wherein said predetermined frame pattern consists of a multi frame pattern.

* * * * *